United States Patent
Lu et al.

(10) Patent No.: US 11,997,700 B2
(45) Date of Patent: May 28, 2024

(54) RESOURCE POOL CONFIGURATION METHOD, DEVICE, AND STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Huei-Ming Lin, South Yarra (AU); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 317 days.

(21) Appl. No.: 17/390,455

(22) Filed: Jul. 30, 2021

(65) Prior Publication Data
US 2021/0360612 A1    Nov. 18, 2021

Related U.S. Application Data

(63) Continuation of application No. PCT/CN2019/074502, filed on Feb. 1, 2019.

(51) Int. Cl.
*H04W 72/51* (2023.01)
*H04L 5/00* (2006.01)
*H04W 72/02* (2009.01)
*H04W 72/23* (2023.01)

(52) U.S. Cl.
CPC .......... *H04W 72/51* (2023.01); *H04L 5/0048* (2013.01); *H04W 72/02* (2013.01); *H04W 72/23* (2023.01)

(58) Field of Classification Search
None
See application file for complete search history.

(56) References Cited

U.S. PATENT DOCUMENTS

| 11,382,083 B2 * | 7/2022 | Guo ..................... H04W 72/23 |
| 11,778,596 B2 * | 10/2023 | Zhao ..................... H04L 5/0042 |
| | | 370/330 |
| 2016/0219620 A1 * | 7/2016 | Lee ..................... H04W 76/14 |
| 2020/0205165 A1 * | 6/2020 | Huang ..................... H04L 1/1854 |

(Continued)

FOREIGN PATENT DOCUMENTS

| CN | 105813204 A | 7/2016 |
| CN | 107079437 A | 8/2017 |
| CN | 107211430 A | 9/2017 |

(Continued)

OTHER PUBLICATIONS

First Office Action issued in corresponding Chinese application No. 202110802715.9, dated Nov. 29, 2022.

(Continued)

*Primary Examiner* — Hong S Cho
(74) *Attorney, Agent, or Firm* — BAYES PLLC

(57) ABSTRACT

The present disclosure provides a resource pool configuration method, including obtaining first configuration information by a terminal device, where the first configuration information is used for indicating that a first resource pool and a second resource pool are configured for the terminal device, the first resource pool is used for sending data and receiving feedback data, and the second resource pool is used for receiving data and sending feedback data.

15 Claims, 4 Drawing Sheets

(56) References Cited

U.S. PATENT DOCUMENTS

2021/0266133 A1* 8/2021 Zhang .................. H04L 1/1861
2021/0377927 A1* 12/2021 Kusashima ........... H04W 72/20

FOREIGN PATENT DOCUMENTS

| CN | 107733574 | A | 2/2018 |
| CN | 108023699 | A | 5/2018 |
| CN | 108023706 | A | 5/2018 |
| CN | 113273120 | A | 8/2021 |
| WO | 2018171563 | A1 | 9/2018 |
| WO | 2020142992 | A1 | 7/2020 |

OTHER PUBLICATIONS

Second Office Action issued in corresponding Chinese application No. 202110802715.9, dated Feb. 22, 2023.
First Office Action issued in corresponding Indian Application No. 202127035906, dated Mar. 10, 2022, 6 pages.
Extended European Search Report issued in corresponding European Application No. 19914054.2, dated Dec. 13, 2021, 12 pages.
"Discussion on physical layer structure for NR V2X", Agenda Item: 7.2.4.1.1, Source: LG Electronics, 3GPP TSG RAN WG1 Ad-Hoc Meeting 1901, R1-1901335, Taipei, Taiwan, Jan. 21-25, 2019, 13 pages.
International Search Report issued in corresponding International Application No. PCT/CN2019/074502, dated Oct. 24, 2019, 27 pages.
PCT Written Opinion of the International Searching Authority issued in corresponding International Application No. PCT/CN2019/074502, dated Oct. 24, 2019, 9 pages.
"New SID: Study on NR V2X", Agenda Item: 9.1.5, Source: Vodafone, 3GPP TSG RAN Meeting #80, RP-181480, Revision of RP-181429, La Jolla, USA, Jun. 11-14, 2018, 5 pages.
Hearing Notice issued in corresponding Indian application No. 202127035906, mailed Feb. 21, 2024.

\* cited by examiner

Obtain first configuration information by a terminal device, and the first configuration information is used for indicating that a first resource pool and a second resource poll are configured for the terminal device, the first resource pool is used for sending data and receiving feedback data, and the second resource pool is used for receiving data and sending feedback data. — S201

FIG.4

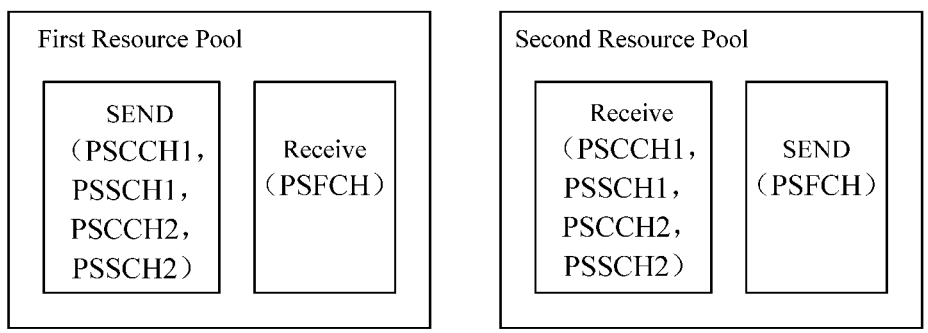

FIG.5

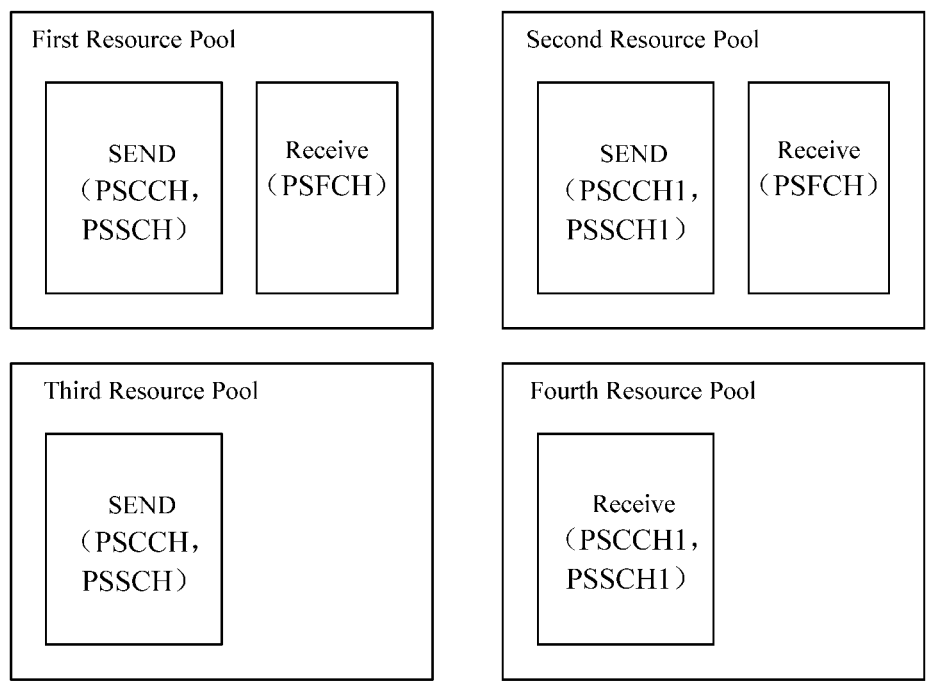

FIG.6

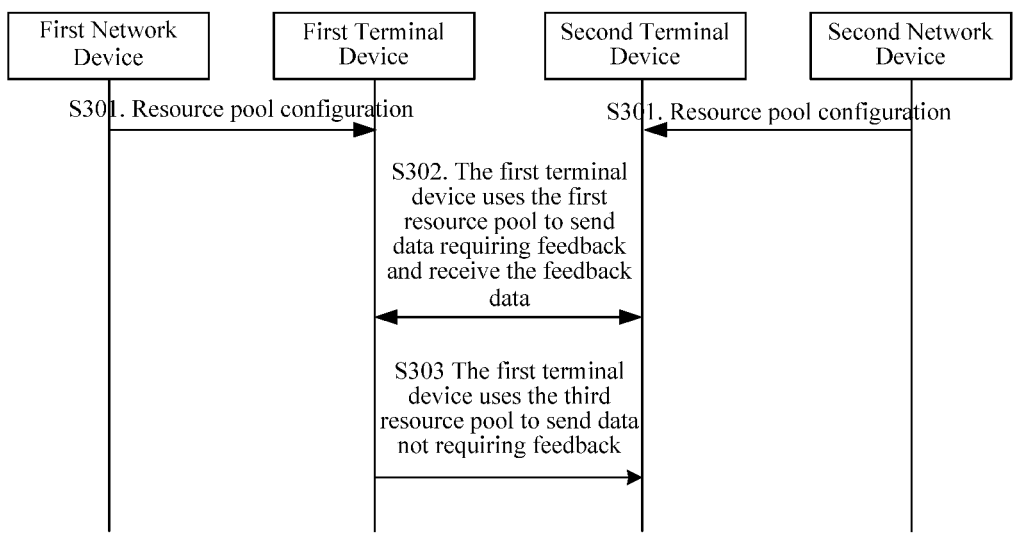

FIG.7

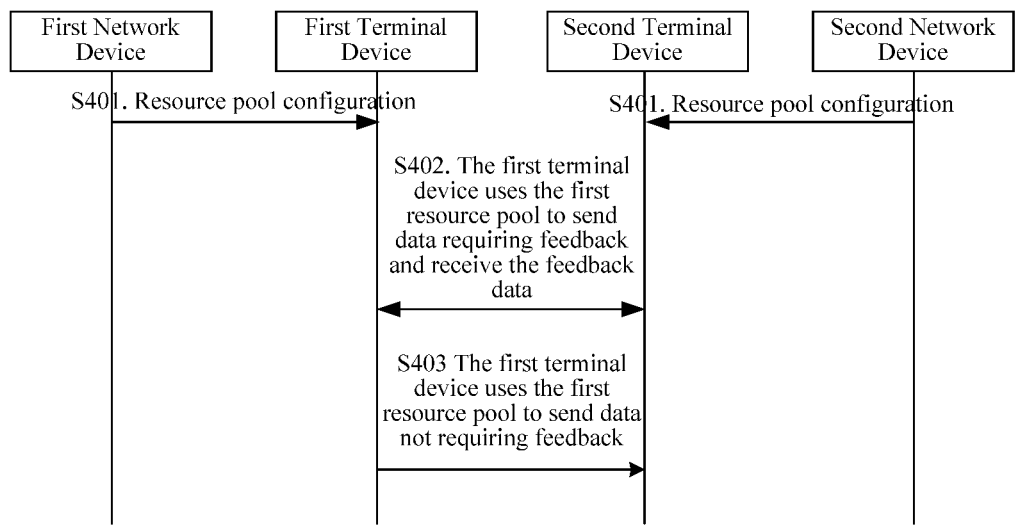

FIG.8

| Send first configuration information by a network device, and the first configuration information is used for indicating that a first resource pool and a second resource poll are configured for the terminal device, the first resource pool is used for sending data and receiving feedback data, and the second resource pool is used for receiving data and sending feedback data. | S501 |

FIG.9

RESOURCE POOL CONFIGURATION METHOD, DEVICE, AND STORAGE MEDIUM

CROSS-REFERENCE TO RELATED APPLICATION

This application is a continuation of International Application No. PCT/CN2019/074502, filed on Feb. 1, 2019, the entire contents of which are incorporated herein by reference.

BACKGROUND

The present disclosure relates to wireless communication technologies, in particular to a resource pool configuration method, a device and a storage medium.

In Vehicle to everything (V2X) and Proximity based Service (ProSe), the transmission of sidelink data is only limited to the physical sidelink control channel (PSCCH) and the physical sidelink shared channel (PSSCH), and the physical sidelink broadcast channel (PSBCH) used for the sidelink synchronization signal (SLSSS) and system messages. Multiple transmission resource pools and multiple reception resource pools are configured for a terminal device. The transmission of the above channels or signal is only limited to the configured transmission resource pool, and the reception of the above channels or signal is only limited to the configured reception resource pool. In this way, the resource pool configuration used for the transmission and reception of channels is limited.

SUMMARY

In view of the above, embodiments of the present disclosure provide a resource pool configuration method, a device, and a storage medium.

A first aspect of the present disclosure provides a resource pool configuration method, including obtaining, by a terminal device, a first configuration information, where the first configuration information is used for indicating that a first resource pool and a second resource pool are configured for the terminal device, the first resource pool is used for sending data and receiving feedback data, and the second resource pool is used for receiving data and sending feedback data.

A second aspect of the present disclosure provides a resource pool configuration method, including sending, by a network device, a first configuration information, where the first configuration information is used for indicating that a first resource pool and a second resource pool are configured for the terminal device, the first resource pool is used for sending data and receiving feedback data, and the second resource pool is used for receiving data and sending feedback data.

A third aspect of the present disclosure provides a terminal device, including a processing unit, configured to obtain first configuration information, where the first configuration information is used for indicating that a first resource pool and a second resource pool are configured for the terminal device, the first resource pool is used for sending data and receiving feedback data, and the second resource pool is used for receiving data and sending feedback data.

A fourth aspect of the present disclosure provides a network device, including a fourth transceiving unit configured to send first configuration information, where the first configuration information is used for indicating that a first resource pool and a second resource pool are configured for the terminal device, the first resource pool is used for sending data and receiving feedback data, and the second resource pool is used for receiving data and sending feedback data.

A fifth aspect of the present disclosure provides a terminal device including a processor and a memory for storing a computer program that can be performed by the processer, where the processor is configured to perform the computer program to implement steps of the resource pool configuration method performed by the terminal device.

A sixth aspect of the present disclosure provides a network device including a processor and a memory for storing a computer program that can be performed by the processer, where the processor is configured to perform the computer program to implement steps of the resource pool configuration method performed by the network device.

A seventh aspect of the present disclosure provides a storage medium storing an executable program that, when executed by a processor, implements the resource pool configuration method performed by the terminal device.

An eighth aspect of the present disclosure provides a storage medium storing an executable program that, when executed by a processor, implements the resource pool configuration method performed by the network device.

BRIEF DESCRIPTION OF THE DRAWINGS

FIG. 4 is a schematic diagram of an optional processing flow of a resource pool configuration method applied to a terminal device according to an embodiment of the present disclosure;

FIG. 5 is an optional schematic diagram of resource pool configuration according to an embodiment of the present disclosure;

FIG. 6 is another optional schematic diagram of resource pool configuration according to an embodiment of the present disclosure;

FIG. 7 is a schematic diagram of an optional processing flow for data transmission based on resource pool configuration according to an embodiment of the present disclosure;

FIG. 8 illustrates an optional processing flow for data transmission based on resource pool configuration according to an embodiment of the present disclosure;

FIG. 9 is a schematic diagram of an optional processing flow of a resource pool configuration method applied to a network device according to an embodiment of the present disclosure;

DETAILED DESCRIPTION

In order to have a thorough understanding of the features and technical contents of the embodiments of the present disclosure, the implementation of embodiments of the present disclosure will be described in detail below with reference to the accompanying drawings. The accompanying drawings are for reference only and are not used to limit the embodiments of the present disclosure.

Before describing embodiments of the present disclosure in detail, a brief description of direct communication will be given first.

D2D communication is a sidelink (SL) transmission technology based on device-to-device. The Internet of Vehicles system can achieve higher spectrum efficiency and lower transmission delay by adopting direct communication from user equipment to user equipment.

Two data transmission modes, that is, mode A and mode B, are defined in the 3th Generation Partnership Project (3GPP).

Figure 1:
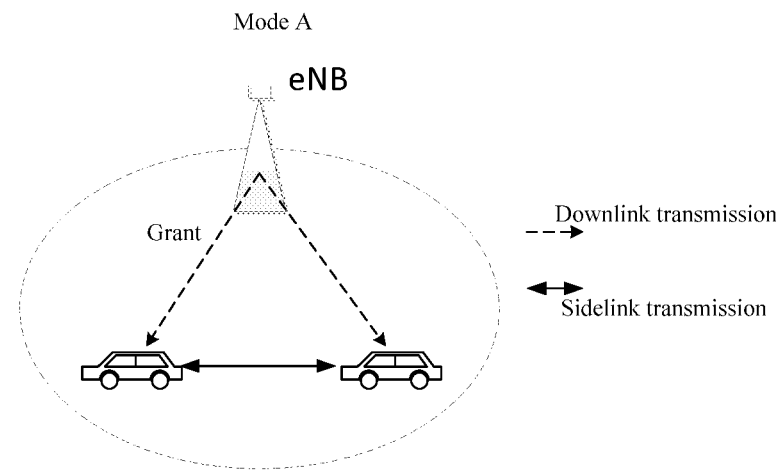
FIG. 1 is a schematic diagram of a processing flow of data transmission in mode A according to the present disclosure.

The data transmission process for mode A is shown in FIG. 1. As shown in FIG. 1, transmission resources for terminal devices are allocated by a base station, and the terminal devices send data on the sidelink according to the resources allocated by the base station. The base station can allocate resources used for a single transmission to the terminal device, and can also allocate semi-persistent static transmission resources to the terminal device.

Figure 2:
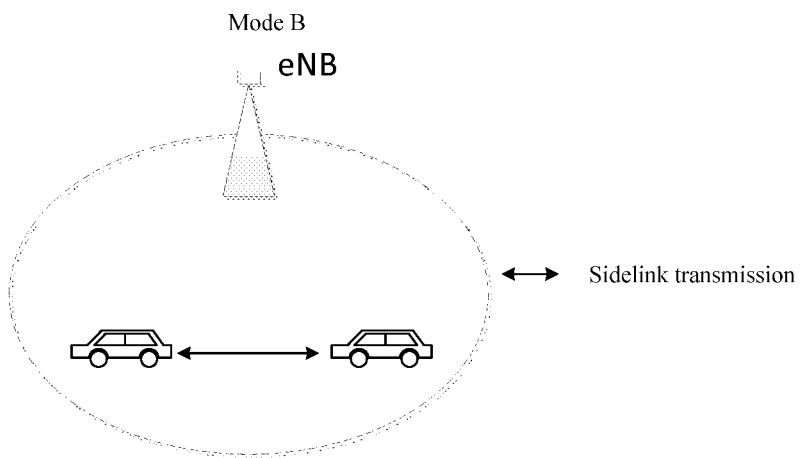
FIG. 2 is a schematic diagram of a processing flow of data transmission in mode B according to the present disclosure.

The data transmission process for mode B is shown in FIG. 2. As shown in FIG. 2, a set of available transmission resources is obtained by the terminal device by sensing in the resource pool, and a resource is randomly selected from the set and used for the transmission of the sidelink data.

In the related art, the network device distinguishes multiple transmission resource pools and multiple reception resource pools based on at least one of the following resource pool attributes: a format of Physical Sidelink Control Channel (PSCCH) or a format of Pysical Sidelink Shared Channel (PSSCH), resource pool synchronization parameters, sending power control parameters, geographic location parameters, and resource selection parameters. The terminal device selects a transmission resource pool among different transmission resource pools according to different resource pool attributes (such as resource pool synchronization parameters, geographic location parameters), or uses different receiving manner to receive different resource pools according to different resource pool attributes (such as the format of PSCCH or the format of PSSCH).

The present disclosure provides a resource pool configuration method, and the resource pool configuration method of embodiments of the present disclosure can be applied to various communication systems, such as a global system for mobile communications (GSM), a code division multiple access (CDMA) system, and a wideband code division multiple access (WCDMA) system, a general packet radio service (GPRS) system, a long term evolution (LTE) system, a LTE frequency division duplex (FDD) system, a LTE time division duplex (TDD) system, a universal mobile telecommunication system (UMTS), a worldwide interoperability for microwave access (WiMAX) communication system or 5G system, etc.

Figure 3:
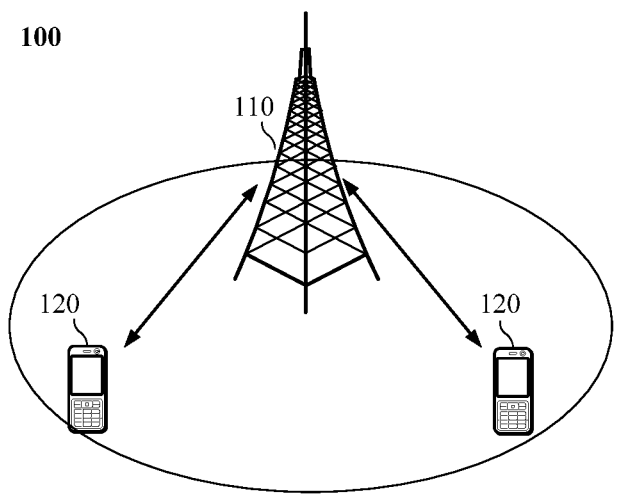
FIG. 3 is a schematic structure diagram of a communication system according to an embodiment of the present disclosure.

For example, embodiments of the present disclosure are applied to a communication system 100 shown in FIG. 3. The communication system 100 can include a network device 110 that communicates with a terminal device 120 (or called as a communication terminal or a terminal). The network device 110 can provide communication coverage over a specific geographic area, and can communicate with terminal devices located in the coverage area. Optionally, the network device 110 may be a base transceiver station (BTS) in a GSM system or a CDMA system, or a Node B (NB) in a WCDMA system, or an evolutional Node B (eNB or eNode B) in an LTE system, or a radio controller in a cloud radio access network (CRAN). Optionally, the network device may be a mobile switching center, a relay station, an access point, a vehicle-mounted device, a wearable device, a hub, a switch, a network bridge, a router, a network side device in the 5G network, or a network device in the future evolution of the public land mobile network (PLMN), etc.

The communication system 100 further includes at least one terminal device 120 located in the coverage area of the network device 110. The "Terminal device" as used herein includes, but is not limited to, a connection via a wired line, such as a connection via Public Switched Telephone Networks (PSTN), a Digital Subscriber Line (DSL), a digital cable and a direct cable; and/or another data connection/network; and/or via a wireless interface, such as cellular network, Wireless Local Area Network (WLAN), digital television network such as DVB-H network, satellite network and an AM-FM broadcast transmitter; and/or a device of another terminal configured to receive/send communication signals; and/or an Internet of things (TOT) device. A terminal device configured to communicate via a wireless interface can be referred as "a wireless communication terminal", "a wireless terminal" or "a mobile terminal". Examples of mobile terminals include, but are not limited to, satellite or cellular phones; Personal Communications System (PCS) terminals integrated with capabilities of cellular radio phones, data processing, fax, and data communication; a PDA that can include radio phones, pagers, Internet/intranet accessing, Web browser, memo pad, calendar, and/or Global Positioning System (GPS) receiver; and conventional laptop and/or palmtop receivers or other electronic device including radio telephone transceivers. The terminal device can refer to access terminals, user equipment (UE), user units, user stations, mobile stations, mobile platforms, remote stations, remote terminals, mobile equipment, user terminals, terminals, wireless communication equipment, user agents, or user devices. The access terminal may be a cellular phone, a cordless phone, a Session Initiation Protocol (SIP) phone, a wireless local loop (WLL) station, a personal digital assistant (PDA), computing devices, handheld devices having wireless communication functions, or other processing devices connected to wireless modems, vehicle-mounted devices, wearable devices, terminal devices in 5G networks, or terminal devices in the future evolution of PLMN, etc.

Optionally, a Device to Device (D2D) communication may be performed between the terminal devices 120.

Optionally, the 5G system or 5G network may also be referred to as a New Radio (NR) system or NR network.

FIG. 3 illustrates schematically one network device and two terminal devices. Optionally, the communication system 100 may include a plurality of network devices, and the number of terminal devices within the coverage of each network device may be not two, which is not limited in the embodiments of the present disclosure.

Optionally, the communication system 100 may further include other network entities such as a network controller and a mobility management entity, which is not limited in the embodiment of the present disclosure.

It should be understood that a device having communication functions in the network/system in the embodiments of the present disclosure may be referred to as a communication device. Taking the communication system 100 shown in FIG. 3 as an example, the communication device may include the network device 110 and the terminal device 120 having communication functions, and the network device 110 and the terminal device 120 may be specific devices described above, which will not be repeated here. The communication device may also include other devices in the communication system 100, such as the network controller, the mobile management entity and other network entities, which are not limited in the embodiments of the present disclosure.

FIG. 4 illustrates an optional processing flow of a resource pool configuration method provided by embodiments of the present disclosure. As shown in FIG. 4, the following step is included.

In step S201, first configuration information is obtained by a terminal device. The first configuration information is used for indicating that a first resource pool and a second resource pool are configured for the terminal device. The first resource pool is used for sending data and receiving feedback data, and the second resource pool is used for receiving data and sending feedback data.

Optionally, the first configuration information is sent to the terminal device from a network device. Alternatively, the first configuration information is pre-configured.

In some embodiments, the first resource pool can be used for data not requiring feedback. It can be understood that, in this case, the first resource pool is used for sending the data to be sent regardless of whether feedback data is required for the data to be sent or not. FIG. 5 is an optional schematic diagram of resource pool configuration according to embodiments of the present disclosure. As shown in FIG. 5, the first resource pool is used for sending data and receiving feedback data, and the second resource pool is used for receiving data and sending feedback data. In the related art, the resource among the resource pool used for sending a channel or signal is determined by the terminal device per se or the network device. A transmission resource pool is only used for sending a channel or signal, and a reception resource pool is only used for receiving a channel or signal. However, the resource used for the transmission of a feedback channel needs to be selected according to instructions of an opposite terminal device communicating with the terminal device. The configuration method of the resource pools in the related art cannot meet the resource requirement of the transmission of the feedback channel. On the contrary, in the embodiments of the present disclosure, the reception resource pool can be used for sending the feedback channel, and the transmission resource pool can also be used for receiving the feedback channel. Therefore, the transmission of the feedback channel is not limited to the transmission resource pool configuration, and the reception of the feedback channel is not limited to the reception resource pool configuration.

For a scenario where the first resource pool can be used for data not requiring feedback, when the data is to be sent, the terminal device first determines the type of the data, and then determines the transmission format of the data based on the type. Optionally, the type of data includes data requiring feedback and data not requiring feedback. The transmission format includes at least a first transmission format and a second transmission format. In a specific implementation, the first transmission format and the second transmission format can be distinguished based on the control channel. Optionally, the first transmission format and the second transmission format is distinguished based on at least one of an indication information carried by the control channel, reference signal sequence characteristics of the control channel, and a scrambling mode of the control channel. For example, the control channel scrambled in the first scrambling mode is data requiring feedback, and the control channel scrambled in the second scrambling mode is data not requiring feedback. The first transmission format and the second transmission format can also be distinguished based on the data channel. Optionally, the first transmission format and the second transmission format are distinguished based on at least one of reference signal sequence characteristics of the data channel, a time domain length of the data channel, and the number of symbols of the data channel. For example, the data sent in the data channel of the first length is data requiring feedback, and the data sent in the data channel of the second length is data not requiring feedback. For example, after receiving the data in the first transmission format, the terminal device transmits the feedback data for the data to a terminal device sending the data, while after receiving the data in the second transmission format, the terminal device does not need to transmit the feedback data to the terminal device sending the data.

In a specific implementation, since resources are shared by data not requiring feedback and data requiring feedback, when the data is to be sent, the time domain length of the data channel used for sending data not requiring feedback can be fixedly selected, by the terminal device, as the same as the time domain of the data channel used for sending data requiring feedback. Alternatively, since some resources need to be reserved, by the data channel requiring feedback, for the feedback channel, the time domain resources occupied by the data channel requiring feedback are less, and the time domain length of the data channel used for data not requiring feedback is fixedly selected as longer than the time domain of the data channel used for data requiring feedback. Optionally, when the data is to be sent, whether the time domain length of the data channel is distinguished according to the data type can be chosen by the terminal device independently, based on the configuration of the network device, or based on the pre-configuration. In a specific implementation, the terminal device may also transmit indication information when sending the data or after sending the data. The indication information is used for indicating time domain length information about the data channel used for sending the data. Optionally, the time domain length information about the data channel indicates whether the time domain length of the data channel used for sending the data is long or short.

In some embodiments, the first resource pool cannot be used for data not requiring feedback. It can be understood that, in this case, the first resource pool is used for sending the data to be sent if feedback data for the data to be sent is required, and the first resource pool is not used for sending the data to be sent if feedback data for the data to be sent is not required.

Optionally, for a scenario where the first resource pool cannot be used for data not requiring feedback, a third resource pool is further configured for the terminal device, and the third resource pool is only used for sending data and cannot be used for receiving feedback data corresponding to the sent data. A fourth resource pool is further configured for the terminal device, and the fourth resource pool is only used for receiving data and cannot be used for sending feedback data corresponding to the received data. It can be understood that if feedback data for the data to be sent is not required, the third resource pool is used for sending the data to be sent. In this case, the fourth resource pool is used for receiving data. FIG. 6 is another optional schematic diagram of the resource pool configuration according to embodiments of the present disclosure. As shown in FIG. 6, the first resource pool is used for sending data requiring feedback and receiving feedback data, and the second resource pool is used for receiving data requiring feedback and sending feedback data; the third resource pool is used for sending data not requiring feedback, and the fourth resource pool is used for receiving data not requiring feedback.

In embodiments of the present disclosure, in the first resource pool, the resources used for receiving feedback data and the resources used for sending data are in a one-to-one correspondence. Here, the one-to-one correspondence refers to having a corresponding relationship that may be set by a network device, preset, or agreed upon by a protocol. If a first resource in the first resource pool is used by the terminal device to send data, a second resource in the first resource pool that has a one-to-one correspondence with the first resource is used by the terminal device to receive feedback data for the sent data. Correspondingly, in the second resource pool, the resources used for sending feedback data and the resources used for receiving data are in a one-to-one correspondence. If a third resource in the second resource pool is used by the terminal device to receive data, a fourth resource in the second resource pool that has a one-to-one correspondence with the third resource is used by the terminal device to send feedback data for the received data to the terminal device sending the data.

For a scenario where the first resource pool cannot be used for data not requiring feedback, the terminal device needs to determine the type of data to be sent when sending data, and the first resource pool or the third resource pool is selected according to the type of the data to be sent. Optionally, the type of data includes data requiring feedback and data not requiring feedback. When the type of data is data requiring feedback, the first resource pool is used for sending the data, and when the type of the data not requiring feedback, the third resource pool is used for sending the data.

The resource pool configuration method provided in the embodiments of the present disclosure is described below with respect to different scenarios.

As for the scenario where the first resource pool cannot be used for data not requiring feedback, and the third resource pool is configured for the first terminal device, an optional processing flow for the data transmission based on the resource pool configuration is shown in FIG. 7.

In step S301, the resource pool configuration is obtained by the first terminal device and the second terminal device.

Optionally, the first terminal device obtains the resource pool configuration from a first network device used for services of the first terminal device, and the second terminal device obtains the resource pool configuration from a second network device used for services of the second terminal device. The first network device and the second network device may be the same network device. Optionally, when at least one of the first terminal device and the second terminal device is in a non-coverage scenario, the resource pool configuration is acquired according to the pre-configuration. The first terminal device acquires the first resource pool used for sending data and receiving feedback data as well as the third resource pool merely used for sending data. The second terminal device acquires the second resource pool used for receiving data and sending feedback data as well as the fourth resource pool merely used for receiving data.

In step S302, the first resource pool is used by the first terminal device to send data requiring feedback and receive feedback data.

Here, the first terminal device first determines the type of data, and a corresponding resource pool is selected for sending data according to the type of data. The type of data includes data requiring feedback and data not requiring feedback.

In step S303, the third resource pool is used by the first terminal device to send data not requiring feedback.

As for the scenario where the first resource pool can be used for data not requiring feedback, another optional processing flow for the data transmission based on the resource pool configuration is shown in FIG. 8.

In step S401, the resource pool configuration is obtained by the first terminal device and the second terminal device.

Here, the first resource pool is obtained by the first terminal device, and the second resource pool is obtained by the second terminal device. The first resource pool is used for sending data requiring feedback, receiving feedback data, and sending data not requiring feedback. The second resource pool is used for receiving data requiring feedback or data not requiring feedback, and sending feedback data.

In step S402, the first resource pool is used by the first terminal device to send data requiring feedback and receive feedback data.

In step S403, the first resource pool is used by the first terminal device to send data not requiring feedback.

It should be noted that, in each embodiment of the present disclosure, a resource in the second resource pool used by the second terminal device to send feedback data has nothing to do with whether the second terminal device is in data transmission mode A or data transmission mode B.

FIG. 9 illustrates an optional processing flow of a resource pool configuration method applied to a network device according to an embodiment of the present disclosure. As shown in FIG. 9, the flow includes step S501.

In step S501, first configuration information is sent by the network device. The first configuration information is used for indicating that a first resource pool and a second resource pool are configured for the terminal device. The first resource pool is used for sending data and receiving feedback data, and the second resource pool is used for receiving data and sending feedback data.

It should be noted that the description based on the first configuration information, the first resource pool, and the second resource pool in the present embodiment is the same as that in the foregoing step S201, and will not be repeated here.

Figure 10:
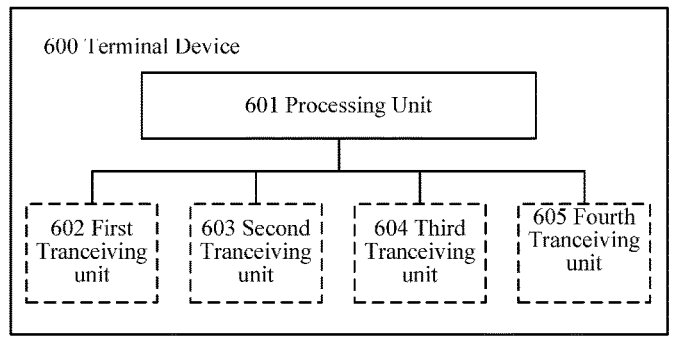
FIG. 10 is a schematic structure diagram of a terminal device according to an embodiment of the present disclosure.

To implement the foregoing resource pool configuration method, an embodiment of the present disclosure further provides a terminal device. The composition structure of the terminal device 600 is shown in FIG. 10. As shown in FIG. 10, the terminal device includes a processing unit 601.

The processing unit 601 is configured to obtain first configuration information. The first configuration information is used for indicating that a first resource pool and a second resource pool are configured for the terminal device. The first resource pool is used for sending data and receiving feedback data, and the second resource pool is used for receiving data and sending feedback data.

In some embodiments, the first resource pool cannot be used for data not requiring feedback.

In some embodiments, the first configuration information is used for indicating that a third resource pool is configured for the terminal device, and the third resource pool is only used for sending data.

In some embodiments, the first configuration information is used for indicating that a fourth resource pool is configured for the terminal device, and the fourth resource pool is only used for receiving data.

In some embodiments, the resources used for receiving feedback data in the first resource pool and the resources used for sending data in the first resource pool are in a one-to-one correspondence.

In some embodiments, the resources used for sending feedback data in the second resource pool and the resources used for receiving data in the second resource pool are in a one-to-one correspondence.

In some embodiments, the processing unit 601 is further configured to determine the type of data to be sent, and select the first resource pool or the third resource pool for sending the data based on the type.

In some embodiments, the terminal device 600 further includes a first transceiving unit 602 configured to, in response to determining that the type of the data is data requiring feedback, send the data by using the first resource pool.

In some embodiments, the first transceiving unit 602 is further configured to, in response to determining that the type of the data is data not requiring feedback, send the data by using the third resource pool.

In some embodiments, the terminal device 600 further includes a second transceiving unit 603 configured to, when the data is received in the second resource pool, send feedback data for the data through a resource in the second resource pool that corresponds to the resource used for receiving the data.

In some embodiments, the processing unit 601 is further configured to determine the type of sent data, and determine the transmission format of the data based on the type. The transmission format includes at least a first transmission format and a second transmission format.

In some embodiments, the first transceiving unit 602 is configured to send the data in a first transmission format by using the first resource pool; or send the data in a second transmission format by using the first resource pool.

In some embodiments, the terminal device 600 further includes a third transceiving unit 603 configured to, in response to determining that the data sent in the first transmission format is received in the second resource pool, send feedback data for the data through a resource in the second resource pool that corresponds to the resource used for receiving the data.

In some embodiments, the first transmission format and the second transmission format are distinguished based on the control channel. Optionally, the first transmission format and the second transmission format are distinguished based on at least one of the following: indication information carried by the control channel; reference signal sequence characteristics of the control channel; and a scrambling mode of the control channel.

In some embodiments, the first transmission format and the second transmission format are distinguished based on the data channel.

Optionally, the first transmission format and the second transmission format are distinguished based on at least one of the following: reference signal sequence characteristics of the data channel; a time domain length of the data channel; and the number of symbols of the data channel.

In some embodiments, the terminal device 600 further includes a fourth transceiving unit 605 configured to send indication information, where the indication information is used for indicating time domain length information about the data channel used for sending the data.

Figure 11:
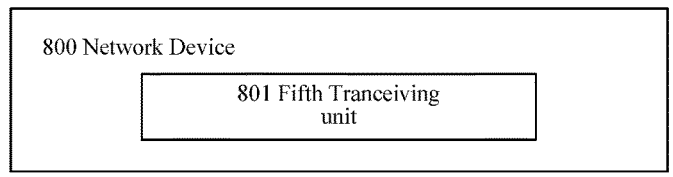
FIG. 11 is a schematic structure diagram of a network device according to an embodiment of the present disclosure.

To implement the foregoing resource pool configuration method, an embodiment of the present disclosure further provides a network device. The composition structure of the network device 800 is shown in FIG. 11. As shown in FIG. 11, the network device includes a fifth transceiving unit 801.

The fifth transceiving unit 801 is configured to send first configuration information. The first configuration information is used for indicating that a first resource pool and a second resource pool are configured for the terminal device. The first resource pool is used for sending data and receiving feedback data, and the second resource pool is used for receiving data and sending feedback data.

In some embodiments, the first resource pool cannot be used for data not requiring feedback.

In some embodiments, the first configuration information is used for indicating that a third resource pool is configured for the terminal device, and the third resource pool is only used for sending data.

In some embodiments, the first configuration information is used for indicating that a fourth resource pool is configured for the terminal device, and the fourth resource pool is only used for receiving data.

In some embodiments, the resources used for receiving feedback data in the first resource pool and the resources used for sending data in the first resource pool are in a one-to-one correspondence.

In some embodiments, the resources used for sending feedback data in the second resource pool and the resources used for receiving data in the second resource pool are in a one-to-one correspondence.

An embodiment of the present disclosure further provides a terminal device, including a processor and a memory for storing a computer program that can run on the processor, where the processor is configured to run the computer program to execute the steps of the above resource pool configuration method.

An embodiment of the present disclosure further provides a network device, including a processor and a memory for storing a computer program that can run on the processor, where the processor is configured to run the computer program to execute the steps of the above resource pool configuration method.

Figure 12:
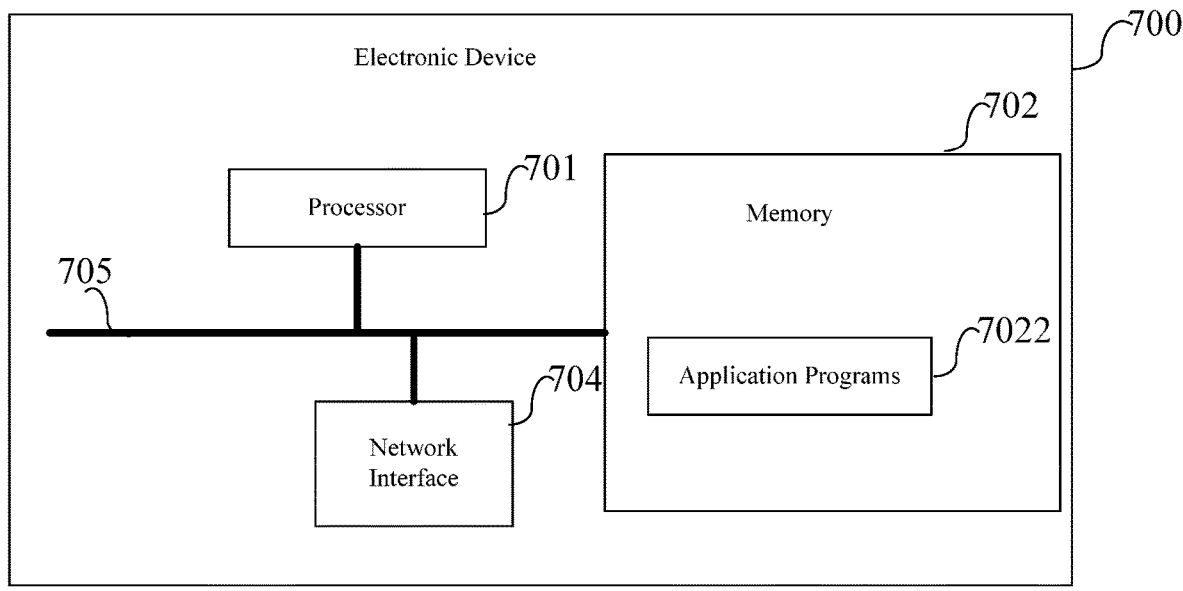
FIG. 12 is a schematic diagram illustrating hardware structure of an electronic device according to an embodiment of the present disclosure.

FIG. 12 is a schematic diagram of the hardware composition structure of an electronic device (terminal device or network device) according to an embodiment of the present disclosure. The terminal device 700 includes at least one processor 701, a memory 702, and at least one network interface 704. The various components in the terminal device 700 are coupled together through the bus system 705. It can be understood that the bus system 705 is used to implement connection and communication between these components. In addition to the data bus, the bus system 705 further includes a power bus, a control bus, and a status signal bus. However, for the sake of clear description, various buses are marked as the bus system 705 in FIG. 12.

It can be understood that the memory 702 may be a volatile memory or a non-volatile memory, and may also include both volatile and non-volatile memory. Among them, the non-volatile memory can be ROM, Programmable Read-Only Memory (PROM), Erasable Programmable Read-Only Memory (EPROM), electrically erasable Programmable read-only memory (EEPROM), ferromagnetic random access memory (FRAM), Flash Memory, magnetic surface memory, optical disk, or Compact Disc Read-Only Memory (CD-ROM). Magnetic surface storage can be disk storage or tape storage. The volatile memory may be a random access memory (RAM), which is used as an external cache. By way of exemplary but not restrictive description, many forms of RAM are available, such as static random access memory (SRAM), synchronous static random access memory (SSRAM), and dynamic random access Memory (DRAM), Synchronous Dynamic Random Access Memory (SDRAM), Double Data Rate Synchronous Dynamic Random Access Memory (DDRSDRAM), Enhanced Synchronous Dynamic Random Access Memory (ESDRAM), SyncLink Dynamic Random Access Memory (SLDRAM), Direct Rambus Random Access Memory (DRRAM)). The memory 702 described in the embodiment of the present disclosure is intended to include, but is not limited to, these and any other suitable types of memory.

The memory 702 according to the embodiments of the present disclosure is used to store various types of data to support the operation of the terminal device 700. Examples of these data include any computer program used to be operated on the terminal device 700, such as an application program 7022. The program for implementing the method of the embodiments of the present disclosure may be included in the application program 7022.

The method described in the embodiments of the present disclosure may be applied to the processor 701 or implemented by the processor 701. The processor 701 may be an integrated circuit chip with signal processing capabilities. In the implementation process, the steps of the foregoing method can be completed by a hardware integrated logic circuit in the processor 701 or instructions in the form of software. The processor 701 may be a general-purpose processor, a digital signal processor (DSP), or other programmable logic devices, discrete gate or transistor logic devices, discrete hardware components, and the like. The processor 701 may implement or execute various methods, steps, and logical block diagrams disclosed in the embodiments of the present disclosure. The general-purpose processor may be a microprocessor or any conventional processor or the like. The steps of the method disclosed in the embodiments of the present disclosure may be directly embodied as being executed and completed by a hardware decoding processor, or executed and completed by a combination of hardware and software modules in the decoding processor. The software module may be located in a storage medium, and the storage medium is located in the memory 702. The processor 701 reads the information in the memory 702 and completes the steps of the foregoing method in combination with its hardware.

In an exemplary embodiment, the terminal device 700 may be embodied as by one or more application specific integrated circuits (ASIC), DSP, Programmable Logic Device (PLD), and complex programmable logic device (CPLD), FPGA, general-purpose processor, controller, MCU, MPU, or other electronic components to implement the foregoing method.

The embodiment of the present disclosure further provides a storage medium for storing computer programs.

Optionally, the storage medium may be applied to the terminal device provided in the embodiment of the present disclosure, and the computer program causes the computer to execute the corresponding process in each method of the embodiments of the present disclosure. For brevity, details are not described herein again.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing equipment to generate a machine, so that a device that implements the functions specified in one process or multiple processes in the flowchart and/or one block or multiple blocks in the block diagram is generated through the instructions executed by the processor of the computer or other programmable data processing equipment.

These computer program instructions can also be stored in a computer-readable memory that can direct a computer or other programmable data processing equipment to work in a specific manner, so that the instructions stored in the computer-readable memory produce an article of manufacture including the instruction device. The device implements the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, so that the instructions executed on the computer or other programmable equipment provide steps for implementing functions specified in a flow or multiple flows in the flowchart and/or a block or multiple blocks in the block diagram.

The above are only some embodiments of the present disclosure, but the scope of protection of the present disclosure is not limited to this. Any modifications, equivalent substitutions and improvement made within the spirit and principle of the present disclosure fall within the protection scope of the present disclosure.

What is claimed is:

1. A method for resource pool configuration, comprising:
   obtaining, by a terminal device, first configuration information, wherein the first configuration information is used for indicating that a first resource pool and a second resource pool are configured for the terminal device, the first resource pool is used for sending data and receiving feedback data, and the second resource pool is used for receiving data and sending feedback data; and
   determining, by the terminal device, a type of data to be sent, and determining a transmission format of the data based on the type, wherein the transmission format comprises at least a first transmission format and a second transmission format,
   wherein the first transmission format and the second transmission format are distinguished based on a control channel.

2. The method according to claim 1, wherein resources used for receiving feedback data in the first resource pool and resources used for sending data in the first resource pool are in a one-to-one correspondence.

3. The method according to claim 1, wherein resources used for sending feedback data in the second resource pool and resources used for receiving data in the second resource pool are in a one-to-one correspondence.

4. The method according to claim 1, further comprising:
   determining, by the terminal device, a type of data to be sent, and selecting, based on the type, whether the first resource pool or a third resource pool is used for sending the data, wherein the third resource pool is only used for sending data;
   in response to determining that the type of the data is data requiring feedback, sending the data by the terminal device by using the first resource pool; and in response to determining that the type of the data is data not requiring feedback, sending the data by the terminal device by using the third resource pool.

5. The method according to claim 1, further comprising:
in response to the terminal device receiving the data sent in the first transmission format in the second resource pool, sending feedback data for the data, by using a resource in the second resource pool corresponding to a resource used for receiving the data, to a terminal device sending the data.

6. The method according to claim 1, wherein the first transmission format and the second transmission format are distinguished based on at least one of the following:
indication information carried by the control channel;
reference signal sequence characteristics of the control channel; or
a scrambling mode of the control channel.

7. A terminal device, comprising a processor and a memory for storing a processer-executable computer program, wherein the processor is configured to run the computer program to obtain first configuration information, wherein the first configuration information is used for indicating that a first resource pool and a second resource pool are configured for the terminal device, the first resource pool is used for sending data and receiving feedback data, and the second resource pool is used for receiving data and sending feedback data, wherein
the processor is further configured to determine a type of data to be sent, and determine a transmission format of the data based on the type, wherein the transmission format comprises at least a first transmission format and a second transmission format, and
the first transmission format and the second transmission format are distinguished based on a control channel.

8. The terminal device according to claim 7, wherein resources used for receiving feedback data in the first resource pool and resources used for sending data in the first resource pool are in a one-to-one correspondence.

9. The terminal device according to claim 7, wherein resources used for sending feedback data in the second resource pool and resources used for receiving data in the second resource pool are in a one-to-one correspondence.

10. The terminal device according to claim 7, wherein the processor is further configured to run the computer program to determine a type of data to be sent, and to select, based on the type, the first resource pool or a third resource pool for sending the data, wherein the third resource pool is only used for sending data, wherein the processor is further configured to:
send the data by using the first resource pool in response to determining the type of the data is data requiring feedback; and
send the data by using the third resource pool in response to determining the type of the data is data not requiring feedback.

11. The terminal device according to claim 7, wherein the processor is further configured to, in response to receiving the data sent in the first transmission format in the second resource pool, send feedback data for the data by using a resource in the second resource pool that corresponds to the resource used for receiving the data.

12. The terminal device according to claim 7, wherein the first transmission format and the second transmission format are distinguished based on at least one of the following:
indication information carried by the control channel;
reference signal sequence characteristics of the control channel; or
a scrambling mode of the control channel.

13. A network device, comprising a processor and a memory for storing a processer-executable computer program, wherein the processor is configured to run the computer program to send first configuration information, wherein the first configuration information is used for indicating that a first resource pool and a second resource pool are configured for a terminal device, the first resource pool is used for sending data and receiving feedback data, and the second resource pool is used for receiving data and sending feedback data, wherein
a type of data to be sent is determined by the terminal device, and the type is used by the terminal device to determine a transmission format of the data, wherein the transmission format comprises at least a first transmission format and a second transmission format, and
the first transmission format and the second transmission format are distinguished based on a control channel.

14. The network device according to claim 13, wherein resources used for receiving feedback data in the first resource pool and resources used for sending data in the first resource pool are in a one-to-one correspondence.

15. The network device according to claim 13, wherein resources used for sending feedback data in the second resource pool and resources used for receiving data in the second resource pool are in a one-to-one correspondence.

* * * * *